Patented Oct. 27, 1931

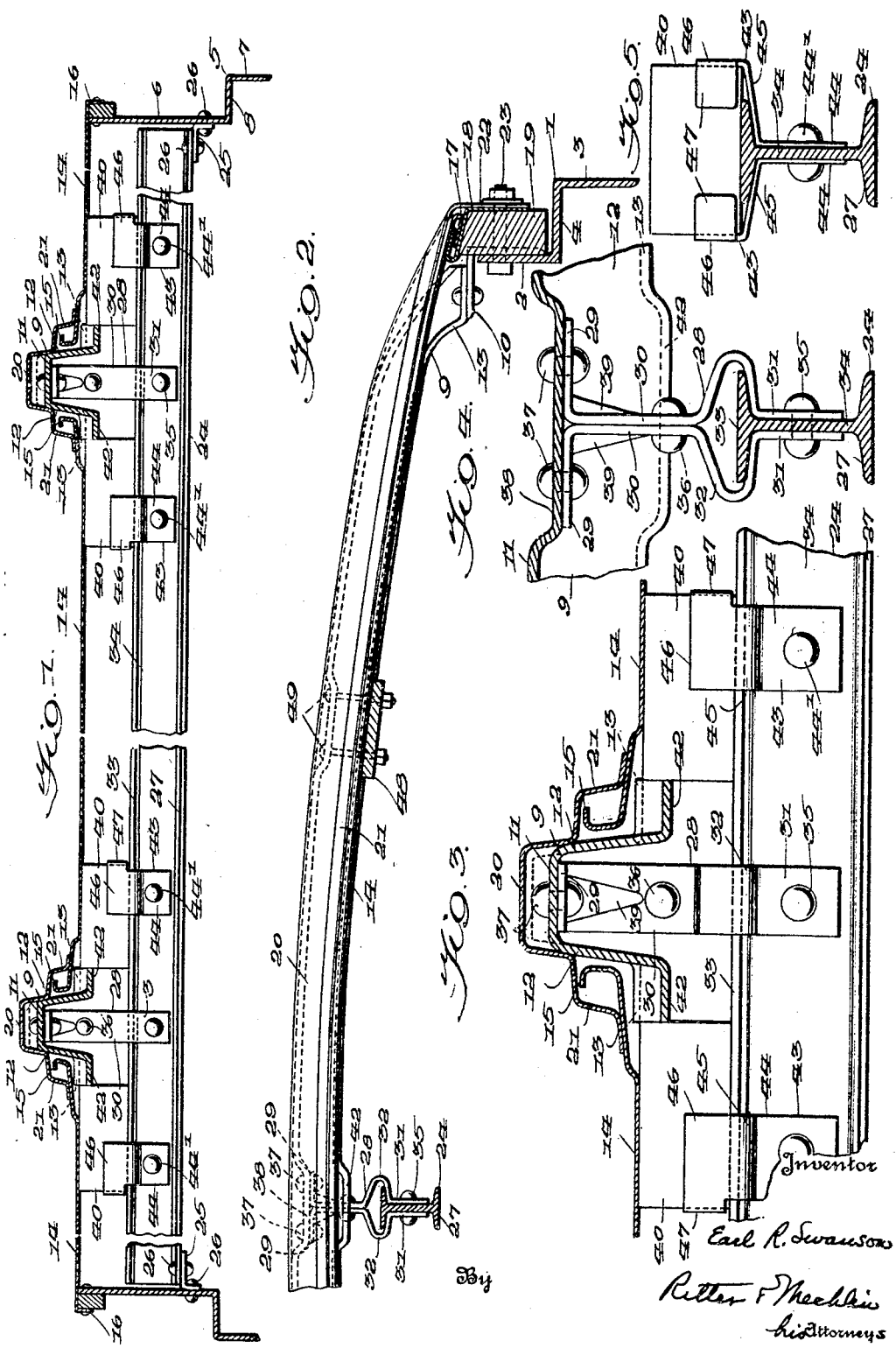

1,829,164

UNITED STATES PATENT OFFICE

EARL R. SWANSON, OF CHICAGO, ILLINOIS, ASSIGNOR TO CHICAGO-CLEVELAND CAR ROOFING COMPANY, OF CHICAGO, ILLINOIS, A CORPORATION OF DELAWARE

RAILWAY CAR

Application filed May 27, 1929. Serial No. 366,400.

My invention relates to railway cars and more particularly to a load lifting device adapted to be associated with the roof structure. A principal object of the invention is to provide means extending longitudinally of the car affording means for receiving a rope, chain or other hoist device whereby automobiles and other articles may be raised above the car floor.

A primary feature of the invention consists in providing a car roof of the type involving carlines and roof sheets with a beam member connected to the carlines and extending longitudinally of the car in spaced relation to the roof sheets, filler members being respectively disposed on opposite sides of each bracket and interposed between the beam member and roof sheets for supporting the latter.

A still further feature of the invention consists in constructing a car roof of the type involving carlines and roof sheets with a beam member secured to the carlines intermediate their ends and extending longitudinally of the car in spaced relation to the roof sheets, filler members being interposed between the beam and each of the roof sheets for supporting the latter and clips being secured to the beam adjacent the filler members for restraining their movement.

Other and more specific features of the invention residing in advantageous forms and combination and relations of parts will hereinafter appear and be pointed out in the claims.

In the drawings illustrating a preferred embodiment of the invention:

Figure 1 is a fragmentary longitudinal sectional view of a car roof embodying the invention.

Figure 2 is a fragmentary transverse sectional view of the car roof.

Figure 3 is an enlarged detailed view of the portion of the roof structure adjacent the carline illustrated in Figure 1.

Figure 4 is an enlarged detailed view taken at right angles to Figure 3, the roof sheets, seam caps and filler members being omitted.

Figure 5 is an enlarged detailed view illustrating the manner of connecting the filler members to the load supporting device.

As the construction of the roof on opposite sides of its longitudinal center is identical the transverse sectional view illustrated in Figure 2 depicts only a little more than one-half of the roof structure.

Referring more particularly to the drawings 1 indicates one of the side plates which may advantageously be of Z-shape having substantially vertical flanges 2 and 3 connected by a horizontal web 4. The end plates 5 of the roof structure, which as is well known are rigidly secured to the side plates, are also of Z-shape being arranged so that their flanges 6 and 7 are disposed in vertical planes and their webs 8 in horizontal planes.

Extending continuously from one side of the car to the other are carlines 9 which may be conveniently connected to the side plates 1 by brackets 10. Each of the carlines is preferably of inverted channel shape having a substantially horizontal web 11 and downwardly projecting substantially vertical sides 12 which respectively terminate in lateral base flanges 13. Spanning the spaces between the carlines and also extending continuously from one eaves edge of the roof to the other are a plurality of roof sheets 14. The lateral marginal edges of each of the roof sheets, with the exception of the outer edge of the end roof sheets, are flanged upwardly as at 15 and are arranged in spaced relation to the adjacent sides of adjoining carlines. The outer edges of the end roof sheets are flanged downwardly as at 16 so as to be conveniently secured to the end plates 5. The eaves edges of the roof sheets are flanged inwardly as at 17 to respectively cooperate with flashing strips 18 secured to side fascias 19 carried by the side plates 1.

Embracing each of the carlines for connecting the adjacent edges of the roof sheets are seam caps 20. The sides of the seam caps are offset as at 21 to form housings for the upturned flanges 15 of the roof sheets and the lower edges of the seam caps are adapted to firmly contact with adjacent portions of the sheets. At their opposite ends the seam caps may, if desired, be flanged downwardly as at 22 and connected to the side plates by bolts 23. Intermediate their ends the seam caps may be firmly secured to the carlines by any suitable means (not shown).

The load lifting device 24, illustrated in the present embodiment of the invention as an I-beam, extends longitudinally of the car substantially midway between the ends of the carlines in spaced relation to the roof sheets 14. The ends of the beam member are preferably secured to the adjoining side plates by brackets 25, rivets 26 being employed for connecting the brackets to the flange 6 of the end plates and to the lower flange 27 of the beam. Intermediate its ends the member is connected to each of the carlines by a pair of similarly formed angular brackets 28 respectively disposed on opposite sides of the beam. Each bracket is formed with a top flange 29, substantially vertical portions 30 and 31 and an intermediate curved or offset portion 32. As stated, the brackets of each pair are disposed on opposite sides of the beam member and the curved or offset portions 32 of the brackets pass around and thereby form a recess for receiving the top flange 33 of the beam. The vertical portions 31 of the brackets of each pair overlappingly engage opposite sides of the web 34 of the beam, being rigidly secured thereto by a rivet 35. Above the beam member the vertical portions 30 are arranged in contact and are preferably connected by a rivet 36. The top flanges 29 which project in opposite directions from the brackets of each pair underlie and are firmly secured by rivets 37 to the web 11 of the associated carline. The web of the carline adjacent the portion to which the brackets are attached is preferably depressed as at 38 so that the attaching rivets 37 will not project upwardly above the general level of the top thereoef. To rigidify and strengthen the brackets the portions 30 of each may be conveniently fashioned with corrugations 39. By thus forming the brackets and firmly attaching them to the carlines and beam it will be appreciated that the latter is supported in a very rigid manner in spaced relation to the roof sheets so as to afford sufficient clearance between it and the sheets to permit a chain, rope or other hoisting device to pass therebetween and be supported by the beam.

To support the roof sheets adjacent the ridge of the roof means is interposed between them and the beam member. This means in the present embodiment of the invention comprises filler members or blocks 40 arranged on opposite sides of each of the carlines, the fillers being of any suitable material such as metal, wood and the like. Each of the filler members projects a sufficient distance beyond the adjacent side of the carline to adequately support adjoining portions of neighboring roof sheets, and each is so proportioned that when resting upon the top flange 41 of the beam member its upper surface will be in engagement with the undersurface of the associated roof sheet. At their inner ends the filler members abut against the marginal edges of the lateral base flanges of the carlines which are offset downwardly as at 42 from the main portion of the base flanges a distance corresponding to that of the offset or depression in the webs of the carlines. Thus movement of the filler members toward each other is effectively prevented. To prevent movement of the filler members in the opposite directions clips 43 are arranged in pairs on opposite sides of the beam member adjacent the outer ends of the fillers. Each of the clips is fashioned with offset substantially vertical lower and upper portions 44 and 46, respectively, connected by a substantially horizontal portion 45 adapted to underlie the top flange 41 of the beam. The portion 44 of each clip is designed for attachment to the web of the beam by a rivet 44' and the portion 46 is adapted to project upwardly above the top flange thereof into engagement with the side of the associated filler to prevent lateral or transverse movement thereof. To prevent movement of the fillers away from the carlines, each portion 46 of the clips is fashioned with a flange 47 engageable with the end of the fillers. Thus it will be seen that the clips and carlines function together to prevent movement of the fillers in any direction.

The usual purlins 48 which are connected to the carlines by bolts 49 may be employed for supporting the portions of the sheets intermediate the ridge and eaves of the roof.

From the foregoing it will be readily perceived that in addition to providing the roof structure with an efficient load lifting device, simple and reliable means are provided for supporting adjacent portions of the roof sheets.

I claim:

1. In a roof for railway cars, the combination with a plurality of carlines, of roof sheets respectively associated with and spanning the spaces between the carlines, a beam member extending longitudinally of the car in spaced relation to the roof sheets, said beam having a substantially vertical portion and a top flange, brackets connecting said beam to the carlines, filler members interposed between said beam and roof sheets for supporting the latter, and clips secured to said beam and having flanges respectively engaging said filler members to prevent movement of the latter longitudinally of the beam.

2. In a roof for railway cars, the combination with a plurality of carlines, of roof sheets respectively associated with and spanning the spaces between the carlines, a beam member extending longitudinally of the car in spaced relation to the roof sheets, brackets connecting said beam and carlines, filler members interposed between the beam and roof sheets for supporting the latter, and clips secured to said beam respectively cooperating with said filler members for limiting movement thereof, each of said clips having portions respectively overlapping a side and one end of the associated filler.

3. In a roof for railway cars, the combination with a plurality of carlines, of roof sheets respectively associated with and spanning the spaces between the carlines, a beam member extending longitudinally of the car in spaced relation to the roof sheets, brackets connecting the beam to each of the carlines, filler members respectively disposed adjacent opposite sides of said carlines and interposed between the beam and roof sheets for supporting the latter, and clips secured to said beam for preventing longitudinal movement of the fillers in one direction, said fillers being in engagement with the carlines to prevent their movement in the opposite direction.

4. In a roof for railway cars, the combination with a plurality of carlines, of roof sheets respectively associated with and spanning the spaces between the carlines, a beam member extending longitudinally of the car in spaced relation to the roof sheets, and pairs of brackets for respectively connecting the beam to the carlines, the brackets of each pair being secured on opposite sides of the beam and being secured together above the said beam.

5. In a roof for railway cars, the combination with a plurality of carlines, each of said carlines having a web and downwardly extending legs, of roof sheets respectively associated with and spanning the spaces between the carlines, a beam member extending longitudinally of the car in spaced relation to the roof sheets, and pairs of brackets for respectively connecting the beam to the carlines, said brackets having substantially horizontal flanges secured to the webs of the carlines and the brackets of each pair being overlappingly secured to opposite sides of the beam and being secured together above the beam.

In testimony whereof I affix my signature.

EARL R. SWANSON.